March 8, 1955  C. J. GAMBARDELLA  2,703,632

GROUND ENGAGING VEHICLE BRAKE

Filed April 8, 1954

*INVENTOR.*
CARMINE J. GAMBARDELLA

BY Kenway, Jenney, Witter & Hildreth

ATTORNEYS

2,703,632

GROUND ENGAGING VEHICLE BRAKE

Carmine J. Gambardella, Warwick, R. I., assignor to Lee Engineering Company, Pawtucket, R. I., a partnership Application April 8, 1954, Serial No. 421,914

3 Claims. (Cl. 188—5)

Portable lifts of the type comprising a truck mounted on casters and equipped with either a manually or electrically operated lifting mechanism are commonly used in factories and warehouses to convey and stack containers, boxes, palletized loads, etc. Due to such factors as the weight of the load, uneven floor, and relative instability of the load, it is necessary both in receiving and discharging a load to hold the truck firmly in the floor. To this end individual locking pins for the casters are sometimes used, but the time and inconvenience involved in applying and removing the locking pins is such as to discourage their use. An alternative arrangement consists of a locking jack which depends from the underside of the truck so that its locking foot may be moved against the floor or retracted upwardly to provide a clearance above the floor of the order of an inch or two. When such tracks are used on uneven or littered floors, or on a way having obstructions, the brake jack is apt to be snapped off and/or the truck tipped so as to jeopardize the load.

The principal objects of the present invention are to overcome the aforementioned difficulties and to provide a simple, efficient, and reliable brake which may be readily attached to a truck chassis, or the like wheeled vehicle, or to a platform, skid, pallet, scale, or other portable device, so as to be quickly operated and released by a simple manipulation of the foot.

Further objects relate to various features of construction and will be apparent from a consideration of the following description and the accompanying drawing wherein.

Figure 1:
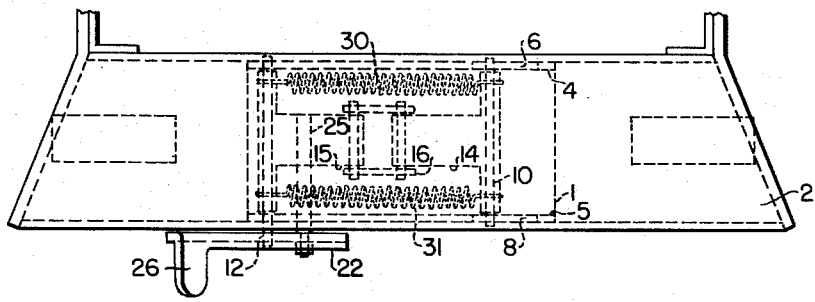
Fig. 1 is a top plan view of my new floor brake applied to the end of a portable lift truck.

The embodiment herein shown for the purposes of illustration comprises an inverted channel shaped member 1 adapted to be welded, bolted or otherwise suitably secured to the underside of the frame or chassis 2 of a conventional lift truck so that the flanges 4 and 5 project downwardly. The corresponding ends of both flanges are formed with slots 6 and 8 (Fig. 1) which receives a slidable pin 10, and the opposite ends of these flanges are provided with openings which rotatably support a pivot pin 12.

One end of links 14 of a toggle is welded or otherwise secured to the slidable pin 10 and the opposite link 15 is likewise secured to the pivot pin 12, the inner ends of these links being pivotally connected to an intermediate inverted U-shaped member 16 having a flat upper face 17 which provides a leveling bracket effective to hold the parts in proper position. The legs of the member 16 are welded or otherwise secured to a brake foot 18 which carries a friction shoe 20. One end of the pin 12 projects outwardly beyond the flange 4 and pivotally supports an operating lever 22. The inner end of the lever is provided with an offset 24 which receives the end of a finger 25 that is welded to the undersurface of link 15, and the opposite end of the lever is formed with a laterally projecting lug 26 which provides an abutment or handle engageable by the toe of the operator to swing the lever from one position to another.

Figure 2:
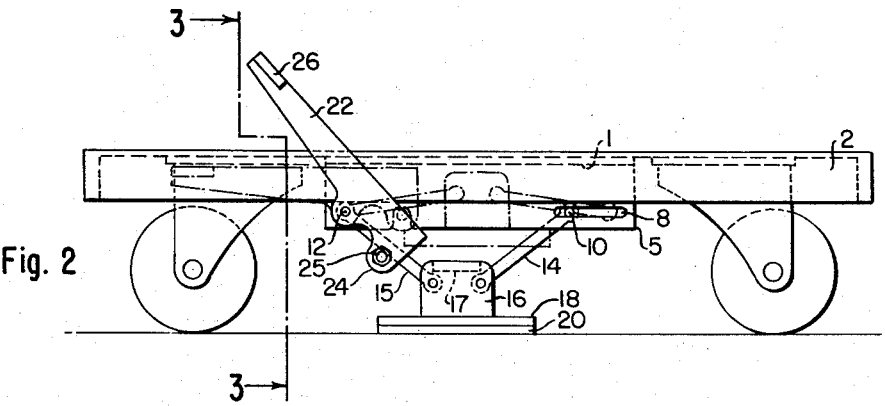
Fig. 2 is a side elevation of the floor brake shown in Fig. 1.
Figure 3:
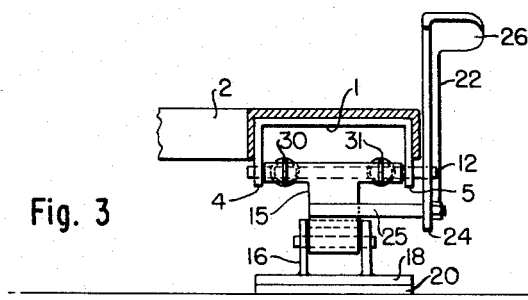
Fig. 3 is an end elevation thereof, partly in section on the line 3—3 of Fig. 2.

With this construction and arrangement of parts, the lever 22 acts on the link 15 through the finger 25 to swing the toggle links 14, 15 inwardly and outwardly so that the locking foot may be moved from extended or locking position, shown by the full lines of Fig. 2, to retracted position wherein the links 14, 15 and intermediate member 16 are disposed within the confines of the flanges 4 and 5 with the links beyond "dead center," as shown by the dot dash lines of Fig. 2. The parts are yieldingly held in either one of these positions by a pair of tension springs 30, 31, the ends of which are connected to the pins 10 and 12. When the lever 22 is swung upwardly both springs 30 and 31 come into action to move the brake foot downwardly and thus cooperate to hold the parts extended with sufficient force to apply a reliable braking action against the floor on which the truck is supported.

It will be observed that when the parts are in retracted position, the toggle links are nested within the confines of the flanges 4 and 5 and the brake foot is disposed against the lower edges of the flanges so that there is normally a clearance above the floor of several inches. Hence, in using the truck on an uneven or littered floor the flanges 4 and 5 provide a protection which prevents damage from being inflicted on the toggle links and associated parts.

Although the invention is herein illustrated as applied to a lift truck, it is to be understood that its utility is not so limited as it is obviously applicable to any conveyance which may be drawn along a floor or the like surface. An important feature of the invention is that it can be adapted for use with several difficult size wheels, whereas the conventional brakes are designed for use with only one specific size wheel.

While I have shown and described one desirable embodiment of the invention it is to be understood that this disclosure is for the purpose of illustration and that various changes and modifications may be made without departing from the spirit and scope of the invention as set forth in the appended claims.

I claim:

1. A brake of the class described, comprising a pair of spaced flanges arranged to depend from the underside of the chassis of the device to which it is to be attached, corresponding ends of said flanges having longitudinally extending slots, a pin having its ends slidably mounted in said slots, toggle links having one end connected to said pin and the other end pivotally connected to the flanges adjacent to the end opposite said slots, a brake foot carried by the intermediate pivotal connection of said toggle links, an operating lever acting on said toggle links so that when said lever is swung from one position to another it moves said brake foot from a retracted position, wherein said toggle links are within the confines of said flanges, to braking position, wherein said toggle linkes are extended so that the brake foot is at the floor level, and spring means acting on said toggle links so as to hold said brake shoe in either position.

2. A brake of the class described, comprising a pair of spaced flanges arranged to depend from the underside of the chassis of the device to which it is to be attached, corresponding ends of said flanges having longitudinally extending slots, a pin having its ends slidably mounted in said slots, toggle links having one end connected to said pin and the other end pivotally connected to the flanges adjacent to the end opposite said slots, a brake foot carried by the intermediate pivotal connection of said toggle links, an operating lever acting on said toggle links so that when said lever is swung from one position to another it moves said brake foot from a retracted position, wherein said toggle links are beyond dead center and within the confines of said flanges, to braking position, wherein said toggle links are extended so that the brake foot is at the floor level, and a tension spring having its opposite ends connected with the outer ends of said toggle links so that when said brake foot is retracted said spring holds the parts in retracted position, and when said brake foot is in braking position said spring holds said parts extended.

3. A brake of the class described, comprising a pair of spaced flanges arranged to depend from the underside of the chassis of the device to which it is to be attached, corresponding ends of said flanges having longitudinally extending slots, a pin having its ends slidably mounted in said slots, a pivot pin carried by the end portions of said flanges opposite said slots, toggle links having their opposite ends connected to the sliding and pivot pins, a brake foot carried by the intermediate pivotal connection of said toggle links, a laterally projecting finger carried by one of said toggle links, an operating lever pivotally mounted on one end of said pivot pin and engageable with said finger so that when swung from one position to another said brake foot moves from a retracted position, wherein said toggle links are beyond dead center and within the confines of said flanges, to braking position, wherein said toggle links are extended so that the brake foot is at the floor level, and a tension spring having its opposite ends connected with the slidable and pivot pins so that when said brake foot is retracted, it holds the parts in retracted position, and when said brake foot is in braking position, said spring holds the parts extended.

References Cited in the file of this patent

UNITED STATES PATENTS

| | | |
|---|---|---|
| 645,628 | Pletcher | Mar. 20, 1900 |
| 737,852 | Lohsand | Sept. 1, 1903 |
| 1,282,054 | Dorohon | Oct. 22, 1918 |
| 1,455,576 | Elliott | May 15, 1923 |